Patented July 18, 1933

1,919,163

UNITED STATES PATENT OFFICE

EDWARD H. JACKSON AND HUGH J. CAMERON, OF FORT WAYNE, INDIANA, ASSIGNORS TO GENERAL ELECTRIC COMPANY, A CORPORATION OF NEW YORK

RESINOUS COMPOSITION AND METHOD OF PREPARING THE SAME

No Drawing.  Application filed January 26, 1931. Serial No. 511,440.

The present invention relates generally to resinous compositions and specifically to resinous compositions of the phenol-aldehyde type which will remain liquid at normal or room temperature for prolonged periods of time but which may conveniently and expeditiously be converted, at will, by heat to the hard, tough, infusible, insoluble state.

We have discovered resinous compositions of the phenol-aldehyde type which will remain liquid for prolonged periods of time at normal or room temperature but which can, at will, be fairly rapidly converted by heat to the hard, thoroughly infusible, insoluble state and when once converted to this state can not be softened again by heat. It is highly desirable to obtain a resin which though normally liquid for prolonged periods of time will cure to the hard, infusible state and not soften again when heated, because it is in this hard, infusible state that resinous compositions of this type offer the greatest mechanical and electrical strength and the greatest heat and chemical resistance. Furthermore, it will be apparent that the manipulation of a resin which remains liquid for prolonged periods of time, whether it be for impregnation purposes or for casting and the like, is easier, more efficient and superior to the manipulation of a resin in a semi-plastic or solid state, or a resin dissolved in a large amount of solvent. It will also be apparent that the use of such a liquid resin for electrical impregnation purposes, is superior to the use of resin dissolved in a large quantity of solvent inasmuch as there is less likelihood for the formation of voids when the resin is converted to the infusible state, due to the absence of the large amount of solvent, which must be evaporated.

In accordance with the present invention, it has been discovered that resinous compositions of the type specified and possessing the desirable properties and characteristics outlined above may be prepared if the reaction of a phenol and aldehyde are caused to take place under certain specific conditions and in the presence of certain ingredients.

The principal features of our invention will be more fully pointed out in the accompanying detailed description thereof and its scope delineated in the appended claims.

In order to obtain a liquid resin of the phenol-aldehyde type it is important that the initial resinification reaction be carried out under conditions such that the reacting ingredients will form a liquid resin but will not react appreciably further than this state.

We have found that this may be accomplished by reacting the phenol and aldehyde in the presence of a substance, which we herein term a primary catalyst, which is of such a nature that it carries the reaction only to a state wherein the resin is liquid at normal temperature. We have found, also, that the measurement of the hydrogen ion concentration of the reaction mixture is a convenient way to determine and ascertain the proper conditions so that this state is reached and maintained and we have further found that this hydrogen ion concentration for liquid resin formation and maintenance lies in the approximate pH range of 6.5 to 8.5, the pH value being that of the reaction mixture and the mass throughout the entire reaction. In order to attain this pH range we have found that it is necessary to employ a catalyst which in itself possesses a hydrogen ion concentration such that the mixture of ingredients employed, when reacted in its presence, produces and maintains a hydrogen ion concentration in the mass requisite for the formation and maintenance of a liquid resin. For example, we have found that triethanolamine is a catalyst imparting to and maintaining in the reaction mixture the requisite pH concentration. Instead of triethanolamine, we may, for example, employ a catalyst such as sodium carbonate of a concentration sufficient to give the proper pH value in the reaction mixture, or we may generally speaking, employ any substance suitably buffered, so that it is of the order of triethanolamine, and maintains conditions such that a liquid resin results. For example, we have employed such substances as trisodium phosphate; a mixture of trisodium phosphate and sodium hydroxide; a mixture of phthalic anhydride and sodium hydroxide; sodium phthalate;

and a mixture of borax and sodium hydroxide. Under ordinary conditions having once reached the liquid resin state by properly conditioning and maintaining the reacton mixture as set forth above, the resin will keep liquid for great lengths of time at normal temperature.

We prefer to employ with the reacting ingredients and the primary catalyst, a salt, such as calcium bromide which we herein term a secondary catalyst. This salt, we have found, acts to aid the initial reaction between the phenol and aldehyde thus enabling these ingredients to more quickly form the liquid resin then acts as an accelerator above a certain temperature to hasten the conversion of the resin to the infusible state, and, at the same time, prevents foaming of the resin while it is being converted to the infusible state and thus prevents the formation of gas pockets in the cured resin. We have found that not only calcium bromide but a whole series of salts function in a similar way, their effectiveness however being unlike. For example, the following series is an illustrative list, not intended to be complete, and giving the order of effectiveness of some cations and anions:

(a) Mg, Na, K, Ca, Ba
(b) $SO_4$, $NO_3$, Cl, Br, I, CNS

This series expresses in the order of increasing effectiveness the action of the various cations and anions as anti-foaming agents and catalysts. For instance, the best catalyst and the best anti-foamer is a salt like calcium or barium sulphocyanate, iodide or bromide, and the worst, the sulphates of potassium and magnesium.

In order that our invention may be better understood the following illustrative examples are given.

*Example I*

|  | Parts by weight |
|---|---|
| Cresol | 30 |
| Paraformaldehyde | 17 |
| Potassium bromide solution (1 part potassium bromide plus 2.68 parts water) | 3.68 |
| Glycerol | 3 |
| Sodium carbonate solution (5 parts sodium carbonate dissolved in water and diluted to 105 parts) | 2.1 |

The ingredients are rapidly heated together to a temperature of 95° to 120° C., with agitation, and then rapidly chilled to room temperature. The resulting product is a clear liquid resin which will remain liquid for a prolonged period of time at normal temperature.

This liquid resin can easily be converted to the hard, tough, thoroughly infusible, insoluble state by a simple curing operation. For example, the resin in liquid form may be cast in suitable molds and converted to the completely cured state by simply heating at a temperature of from 85° to 125° C., the time varying, of course, with the temperature employed, from about 2 or 3 hours upward.

In this example it will be observed that the primary catalyst is a solution of sodium carbonate of the requisite pH value. The potassium bromide is the secondary catalyst and anti-foaming agent. The glycerol is added to aid in keeping the primary catalyst in solution. The cresol contained approximately 30% ortho, 40% meta, and 30% para constituents.

Following the procedure outlined in Example I liquid resins may be made and cured using the following formulas:

*Example II*

|  | Parts by weight |
|---|---|
| Cresol | 30 |
| Paraformaldehyde | 17 |
| Triethanolamine | 2.5 |
| Calcium bromide solution (1 part calcium bromide plus 2.68 parts water) | 3.68 |
| Saturated lime water | 3 |

*Example III*

|  | Parts by weight |
|---|---|
| Cresol | 30 |
| Paraformaldehyde | 17 |
| Potassium bromide solution as in Example I | 3.68 |
| Trisodium phosphate solution (5 parts by weight of trisodium phosphate dissolved in water and diluted to 102.5 parts by weight) | 4.1 |
| Glycerol | 4 |

*Example IV*

|  | Parts by weight |
|---|---|
| Cresol | 30 |
| Paraformaldehyde | 17 |
| Potassium bromide solution as in Example I | 3.68 |
| Glycerol | 3 |
| Trisodium phosphate-sodium hydroxide solution (5 parts by weight trisodium phosphate plus 1 part by weight sodium hydroxide dissolved in water and diluted to 104 parts by weight) | 4.15 |

*Example V*

|  | Parts by weight |
|---|---|
| Cresol | 30 |
| Paraformaldehyde | 17 |
| Potassium bromide solution (as in Example I) | 3.68 |
| Glycerol | 3 |
| Phthalic anhydride-sodium hydroxide solution (7 parts by weight phthalic anhydride plus 5 parts by weight sodium hydroxide dissolved in water and diluted to 110 parts by weight) | 4.4 |

Example VI

| | Parts by weight |
|---|---|
| Cresol | 30 |
| Paraformaldehyde | 17 |
| Potassium bromide solution (as in Example I) | 3.68 |
| Glycerol | 3 |
| Borax-sodium hydroxide solution (10 parts by weight borax plus 5 parts by weight sodium hydroxide dissolved in water and diluted to 110 parts by weight) | 4.4 |

The liquid resins obtained by the process of our invention are capable of maintaining their liquid state for prolonged periods of time, which periods are of the order of months or years and are not definitely fixed. The resins vary in color both in the liquid state and in the final infusible, insoluble state, the variation being from yellow-white to dark reddish-brown depending on the materials employed.

One of the outstanding characteristics of the liquid resins of our invention is their marked stability for prolonged periods of time at room or normal temperature. Another outstanding characteristic is the presence therein of the secondary catalyst which acts more rapidly above a certain temperature, for example, above approximately 70° C., to hasten the conversion to the infusible state, and prevents foaming and hence the formation of voids or gas pockets in the cured resin.

The cured product being ordinarily free from gas pockets is admirably suited for electrical insulation purposes. In some cases, there may be a tendency of the cured resin to swell and crack if heated at a temperature of about 100° C. or higher. To obviate this difficulty, which, it was discovered was due to the vapor pressure of the dispersed water in the cured and gelled resins, the water as a solvent in the reacting mass is replaced by a solvent of much lower vapor pressure than water; for example, by a substance such as glycerol. When this is done the liquid resin is not only improved in stability but yields in curing a very good heat resistant resin which does not swell or crack. To illustrate this phase of the invention the following illustrative example is given;

Example VII

| | Parts by weight |
|---|---|
| Cresol | 30 |
| Paraformaldehyde | 14 |
| Reagent mixture | 9.1 |

The reagent mixture is prepared as follows:

4 parts sodium hydroxide are dissolved in 167 parts glycerol by heating the ingredients. To this is then added 7 parts phthalic anhydride and 22 parts potassium bromide and dissolved by heating. The solution is then cooled. This reagent mixture contains approximately 5.5% by weight sodium phthalate, 11.0% potassium bromide and 83.5% glycerol.

The cresol, paraformaldehyde and reagent mixture are rapidly heated to 120° C. and chilled to room temperature. The resin obtained after curing is very dense, hard, and tough. The liquid resin is itself markedly more stable in character.

Instead of merely heating the ingredients rapidly to 95° C. to 120° C. and then immediately chilling to room temperature the ingredients can be heated rapidly to the temperature indicated and held at this temperature for a space of time varying from 5 minutes to about an hour. The result is a liquid resin slightly more viscous in nature but nevertheless stable and retaining its fluidity for a prolonged period of time. The increase in cooking time results in a diminution of free formaldehyde in the resin which is in some cases desirable. The liquid resin so obtained is particularly suitable for casting purposes. If desired, the resin may be cut with a small amount of solvent such as a mixture of toluol, butanol, and alcohol in a ratio of, for example, 5:2:3, and is thus admirably suited as a varnish. Very good results have been obtained in curing the resin so cut at temperatures of 85° to 100° C. without foaming, swelling or cracking taking place.

The liquid resins of our invention may be employed with especial success in impregnating various electrical parts. For example, coils employed in various types of electrical apparatus may be impregnated with the liquid resin at room temperature. If desired, the object which is to be impregnated may first be warmed and then dipped into the liquid resin at room temperature, or the resin may be slowly warmed first before the object is dipped therein. With an article, such as an electrical coil, the impregnation may take place in a suitable chamber which is first evacuated after the coil is placed therein, the liquid resin being then introduced, pressure applied, then released, and the impregnated coil drained and cured as stated above.

For molding work the liquid resin may easily be applied to or mixed with various fillers and molded under heat and pressure and if desired in the presence of suitable coloring agents, dyes, pigments and the like.

Plasticizers of various sorts, for example, acetanilide, camphor, etc., may be incorporated with the liquid resin as such or during its formation.

The invention is not limited to the use of cresol and paraformaldehyde as the initial reacting ingredients. Other phenolic bodies may be used. For example, the liquid resins may be formed with any grade of phenol, or any of the mixtures of phenols and cresols, or any mixtures of cresols, or xylenols, etc. Likewise, in place of paraformaldehyde other aldehydes may be employed, preferably in the non-aqueous form to avoid an excess of water during the curing period. The proportions of aldehyde to phenol while not fixed in character should be about 1 to 2 mols of aldehyde to 1 mol of phenol. The proportion of primary catalyst is small as will be observed from the illustrations given, as is also the proportion of secondary catalyst.

The terms "normal temperature" or "room temperature" are intended in this application to mean a temperature within the approximate range of 20° C. to 30° C.

The present application is a continuation, in part, of our copending application, Serial No. 413,930, filed December 13, 1929 which application is also assigned to the assignee of the present application.

What we claim as new and desire to secure by Letters Patent of the United States, is,—

1. A stable liquid resinous composition adapted to be converted by heat to the hard, infusible, insoluble state which comprises the product of reaction of cresol, paraformaldehyde, and a mixture of sodium phthalate and potassium bromide dissolved in glycerol.

2. A stable liquid resinous composition adapted to be converted by heat to the hard, infusible, insoluble state which composition is the product of reaction of a phenol and an aldehyde in the presence of a catalyst which imparts to the reaction mixture and maintains in the mass at normal temperature a pH value within the approximate range 6.5 to 8.5.

3. The process of forming a resinous composition which will maintain its liquid state at normal temperature for prolonged periods of time but which can at will be converted by heat to the hard, infusible, insoluble state, which comprises reacting cresol and paraformaldehyde in the ratio of approximately 1 mol to 1 to 2 mols in the presence of an ethanolamine and calcium bromide, by heating the ingredients rapidly to about 100° C. and rapidly chilling the mass to room temperature.

4. The process of forming a resinous composition which will maintain its liquid state at normal temperature for prolonged periods of time but which can at will be converted by heat to the hard, infusible, insoluble state, which comprises reacting a phenol and aldehyde in the ratio of about 1 mol to 1 to 2 mols in the presence of a catalyst which imparts to the reaction mixture and maintains in the mass a pH value within the approximate range of 6.5 to 8.5, by heating the mass rapidly to a temperature of about 100° C. and chilling the mass to room temperature.

5. The process of forming a resinous composition which will maintain its liquid state at normal temperature for prolonged periods of time but which can at will be converted by heat to the hard, infusible, insoluble state, which comprises reacting a phenol and aldehyde in the ratio of about 1 mol:2 mols in the presence of a catalyst which imparts to the reaction mixture and maintains in the mass a pH value within the approximate range of 6.5 to 8.5, the reaction taking place within a liquid medium having a vapor pressure lower than that of water at the same temperature, by heating the mass rapidly to a temperature of about 100° C. and chilling the mass to room temperature.

6. The process of forming a resinous composition which will maintain its liquid state at normal temperature for prolonged periods of time but which can at will be converted by heat to the hard, infusible, insoluble state, which comprises reacting a phenol and aldehyde in the ratio of about 1 mol:2 mols. in the presence of a catalyst which imparts to the reaction mixture and maintains in the mass a pH value within the approximate range of 6.5 to 8.5, within glycerol as the solvent, by heating rapidly to a temperature of about 100° C. and chilling the mass to room temperature.

7. The process of forming a resinous composition which will maintain its liquid state at normal temperature for prolonged periods of time but which can at will be converted by heat to the hard, infusible, insoluble state, which comprises reacting a phenol and aldehyde in the ratio of about 1 mol:2 mols in the presence of a catalyst which imparts to the reaction mixture and maintains in the mass a pH value within the approximate range of 6.5 to 8.5, by heating rapidly to a temperature of 95° to 120° C. and holding at this temperature for a time between the approximate limits five minutes to one hour.

8. The process of preparing a stable liquid resinous composition adapted to be converted by heat to the hard, infusible, insoluble state, which comprises reacting a phenol and an aldehyde in the presence of a catalyst which imparts to the reaction mixture and maintains in the mass a pH value within the approximate range 6.5 to 8.5.

EDWARD H. JACKSON.
HUGH J. CAMERON.